(12) United States Patent
Merdek

(10) Patent No.: US 10,772,773 B2
(45) Date of Patent: Sep. 15, 2020

(54) ILLUMINATION SYSTEM FOR MEDICAL PATIENT TRANSPORT STRETCHERS

(71) Applicant: Jonathan W. Merdek, Bloomington, IN (US)

(72) Inventor: Jonathan W. Merdek, Bloomington, IN (US)

( * ) Notice: Subject to any disclaimer, the term of this patent is extended or adjusted under 35 U.S.C. 154(b) by 242 days.

(21) Appl. No.: 15/898,200

(22) Filed: Feb. 15, 2018

(65) Prior Publication Data
US 2018/0228676 A1   Aug. 16, 2018

Related U.S. Application Data

(60) Provisional application No. 62/459,845, filed on Feb. 16, 2017.

(51) Int. Cl.
| | | |
|---|---|---|
| *A61G 7/00* | (2006.01) | |
| *A61G 1/04* | (2006.01) | |
| *F21V 21/15* | (2006.01) | |
| *H05B 47/11* | (2020.01) | |
| *H05B 47/105* | (2020.01) | |
| *F21V 33/00* | (2006.01) | |
| *A61G 1/02* | (2006.01) | |

(52) U.S. Cl.
CPC .............. *A61G 1/04* (2013.01); *F21V 21/15* (2013.01); *H05B 47/105* (2020.01); *H05B 47/11* (2020.01); *A61G 1/02* (2013.01); *A61G 2203/30* (2013.01); *A61G 2203/32* (2013.01); *A61G 2203/36* (2013.01); *F21V 33/0068* (2013.01)

(58) Field of Classification Search
CPC ............ A61G 2203/32; A61G 2203/34; F21V 33/0068; A61B 2090/308
See application file for complete search history.

(56) References Cited

U.S. PATENT DOCUMENTS

| | | | |
|---|---|---|---|
| 1,090,984 A | 3/1914 | Hawthorne | |
| 1,500,057 A | 7/1924 | Corns | |
| 1,925,115 A | 9/1933 | Seiss | |
| 2,498,287 A | 2/1950 | McLellan | |
| 5,494,051 A | 2/1996 | Schneider, Sr. | |
| 5,537,700 A | 7/1996 | Way et al. | |
| 5,913,559 A | 6/1999 | Sexton et al. | |
| 6,702,314 B1* | 3/2004 | Crose ...................... | A61G 5/10 280/304.1 |
| 7,676,861 B2 | 3/2010 | Ward et al. | |
| 8,051,511 B2 | 11/2011 | Nahavandi et al. | |
| 8,382,181 B2 | 2/2013 | Bourgraf et al. | |
| 2002/0083527 A1* | 7/2002 | Ruehl ....................... | A61G 7/05 5/600 |
| 2009/0211026 A1 | 8/2009 | Schoff | |
| 2014/0056011 A1* | 2/2014 | Clement ................... | F21L 4/04 362/464 |
| 2014/0313700 A1* | 10/2014 | Connell ................... | A61G 7/05 362/130 |

(Continued)

FOREIGN PATENT DOCUMENTS

WO    2001001913 A1    1/2001

*Primary Examiner* — Andrew J Coughlin
(74) *Attorney, Agent, or Firm* — Faegre Drinker Biddle & Reath LLP

(57) ABSTRACT

An adaptable rugged illumination system for use with an emergency medical stretcher. The illumination system illustratively includes a light source, wherein the emitted light may be controlled based upon detected movement of the stretcher.

22 Claims, 3 Drawing Sheets

(56) References Cited

U.S. PATENT DOCUMENTS

| | | | |
|---|---|---|---|
| 2014/0313761 A1* | 10/2014 | Nelson-Herron | G09F 17/00 362/523 |
| 2016/0106605 A1* | 4/2016 | Valentino | A61G 1/0262 700/275 |
| 2017/0128296 A1* | 5/2017 | Kostic | A61G 7/0527 |

\* cited by examiner

ILLUMINATION SYSTEM FOR MEDICAL PATIENT TRANSPORT STRETCHERS

CROSS-REFERENCE TO RELATED APPLICATION

The present application claims priority to U.S. Provisional Patent Application Ser. No. 62/459,845, filed Feb. 16, 2017, the disclosure of which is expressly incorporated herein by reference.

BACKGROUND OF THE DISCLOSURE

The present invention relates generally to patient transport stretchers and, more particularly, to an illumination system for use on such patient transport stretchers to assist in safely and efficiently transporting patients in dimly lit environments.

Emergency medical professionals may work in dynamic environments, often with little or no surrounding environmental light. Navigating a stretcher (also known as cots, trollies, and gurneys) in low light environments may cause medical professionals to incur additional safety risks and/or delays while attempting to safely maneuver their stretcher to the patient and/or back to the emergency vehicle once the patient has been loaded onto the stretcher.

Current emergency vehicles, including patient transport vehicles (e.g., ambulances), may incorporate scene illumination means. However, such illumination means are not always effective in emitting light where it is needed. Obstacles at emergency scenes (such as other vehicles, terrain, physical structures, landscaping, etc.) routinely cause the light emitted from the emergency vehicle to become ineffective, and can at times be deemed hazardous if glare hinders the vision of emergency medical professionals. As such, there remains a need for effective illumination means for emergency medical professionals maneuvering stretchers during times of reduced visibility, thus improving crew and patient safety.

SUMMARY OF THE DISCLOSURE

The present invention relates to an adaptable stretcher illumination system and a method of providing illumination means to various makes and models of emergency medical stretchers. The illustrative illumination system is configured to be mounted to various locations with different methods depending upon the make and model of the stretcher. The illustrative method provides safe illumination under and around the immediate area surrounding the stretcher.

Illustrative means of equipment mounting include utilizing preexisting physical features of a stretcher's design with custom fit mounting hardware, universal adjustable mounting hardware, clamps, and/or permanent modifications to the stretcher's structure.

Illustrative methods of mounting a rugged adaptable stretcher illumination system include providing general adjustable brackets and/or custom brackets utilizing preexisting physical design features of varying stretcher makes and models. Both general and custom brackets may utilize clamps and similar coupling means.

Illustratively, an illumination module may be mounted to a mounting bracket utilizing existing rails of the stretcher. The mounting bracket may utilize multiple positions within rails to mount the illustrative illumination module.

In another illustrative embodiment, the illumination module may be secured to the stretcher structure with a releasable strap.

Illustratively, the illumination module may be mounted to the stretcher with minor modifications to the stretcher structure, such as drilling holes (for use of nuts and bolts and/or screws) and welding mounts to the stretcher structure.

In an illustrative embodiment, an actuator may be operably coupled to each of the illumination modules to alter the direction of the emitted light. In another illustrative embodiment, non-mechanical solid state means may be utilized to alter the direction of the emitted light. In a further illustrative embodiment, the illumination modules and the emitted light may be fixed in position.

According to an illustrative embodiment of the present disclosure, a patient transport apparatus includes a frame, a plurality of wheels supporting the frame, and a first light emitting module supported by the frame. The first light emitting module includes a light source configured to emit light. A motion sensor is supported by the frame, and a controller is operably coupled to the motion sensor. A controller is operably coupled to the motion sensor, wherein the controller is configured to vary the direction of the emitted light based upon input from the motion sensor. In one illustrative embodiment, an actuator is operably coupled to the light source to move the light source about at least two orthogonal axes, wherein the controller causes the actuator to move the light source in response to input from the motion sensor and vary the direction of the emitted light. In another illustrative embodiment, the controller includes solid state means wherein the first light emitting module includes a plurality of fixed light sources emitting light in a plurality of different directions, the solid state means configured to activate different fixed light sources to vary the direction of the emitted light.

According to another illustrative embodiment of the present disclosure, a patient transport apparatus includes a frame, a plurality of wheels supporting the frame, and a first light emitting module supported by the frame. The first light emitting module includes a light source. An impact sensor is supported by the frame and is configured to detect an impact event on the frame. An event recorder is configured to provide a time and date stamp associated with the detected impact event. A controller is operably coupled to the event recorder, the controller including a memory configured to record the time and date stamp associated with the detected impact.

According to a further illustrative embodiment of the present disclosure, a patient transport apparatus includes a frame, a plurality of wheels supporting the frame, and a first light emitting module supported by the frame. The first light emitting module includes a light source, and an actuator operably coupled to the light source to move the light source about at least two orthogonal axes. A controller is operably coupled to the actuator, and a user interface is operably coupled to the controller. The user interface includes an activation input, a light intensity input and an actuator positioning input.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying features, in which.

DETAILED DESCRIPTION OF THE DRAWINGS

Figure 1:
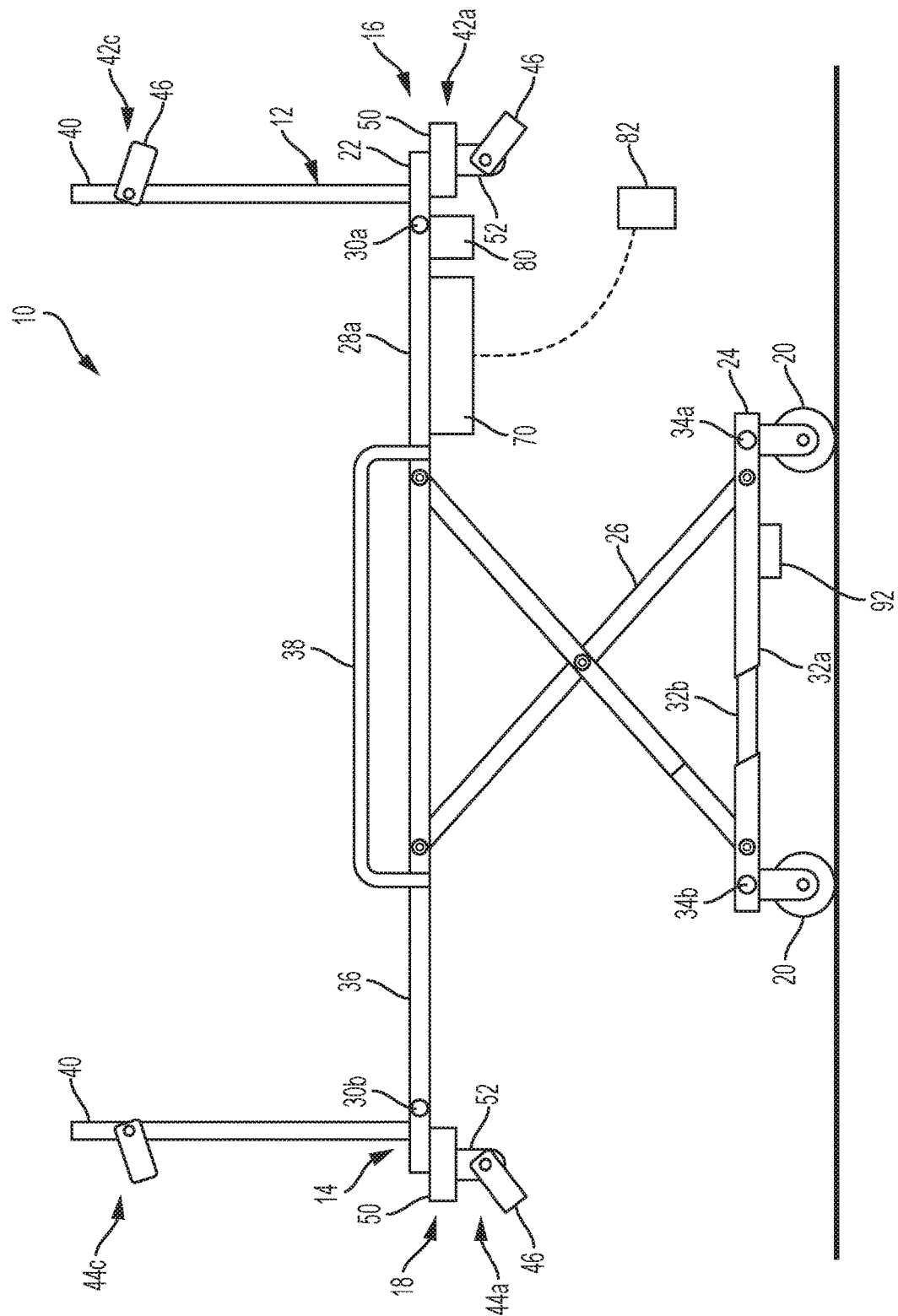
FIG. 1 is a side elevational view of a patent transport stretcher including an illustrative illumination system of the present disclosure.

Referring initially to FIG. 1, a patient transport stretcher 10 is shown for use with an illustrative illumination or lighting system 12 of the present disclosure. The patient support stretcher 10 illustratively includes a frame 14 extending between a first or head end 16 and a second or foot end 18. A plurality of retractable wheels 20 support the frame 14 such that the patient support stretcher 10 may be moved.

The frame 14 illustratively includes an upper frame 22 coupled to a lower frame 24 by a lift mechanism 26. The lift mechanism 26 may be a conventional device, such as an actuator driven scissors lift, configured to raise and lower the upper frame 22 relative to the lower frame 24. The upper frame 22 illustratively includes longitudinally extending first and second upper frame rails 28a and 28b, and first and second upper cross-members 30a and 30b extending laterally between the first and second upper frame rails 28a and 28b. The lower frame 24 illustratively includes longitudinally extending first and second lower frame rails 32a and 32b, and first and second lower cross-members 34a and 34b extending laterally between the first and second lower frame rails 32a and 32b.

A patient support surface 36, such as a mattress, is illustratively supported by the upper frame 22. A pair of laterally spaced side guard rails 38 are illustratively supported by the upper frame 22 on opposite sides of the patient support surface 36. Intravenous (IV) support poles 40 are illustratively coupled proximate opposite corners of the frame 14 (FIGS. 1 and 2) and are configured to support medical accessories, such as IV bags.

First and second front light emitting modules 42a and 42b are illustratively supported by the upper frame 22 proximate the head end 16. Similarly, first and second rear light emitting modules 44a and 44b are illustratively supported by the upper frame 22 proximate the rear end 18. In certain illustrative embodiments, at least one auxiliary or area light emitting module 42c, 44c is supported by at least one of the IV support poles 40 (FIG. 1).

Figure 3:
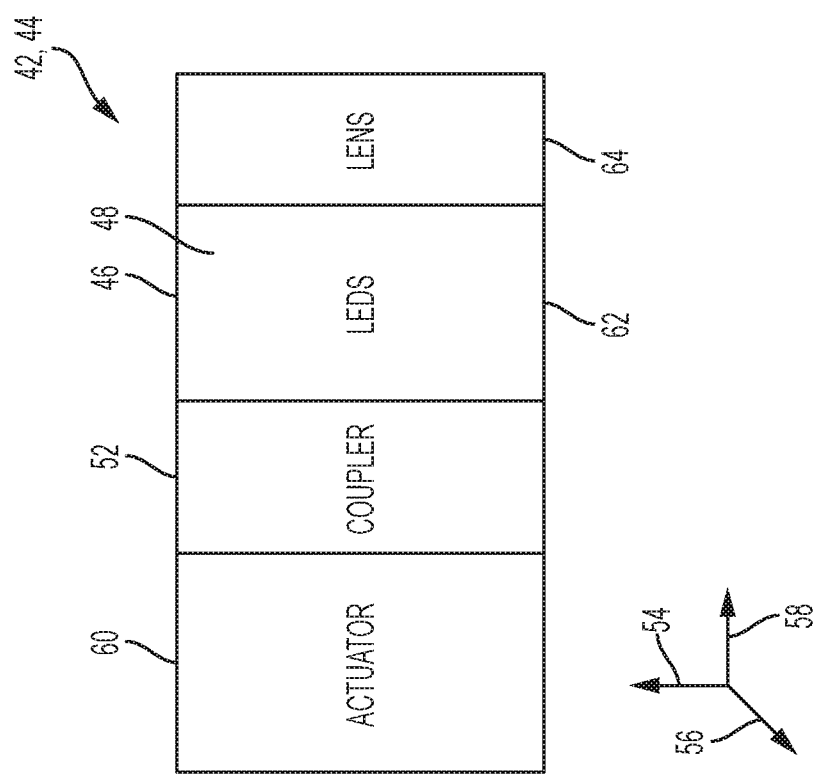
FIG. 3 is a diagrammatic view of an illustrative illumination module of the illumination system of FIG. 2.

With reference to FIGS. 1 and 3, each light emitting module 42, 44 illustratively includes a light source 46. The light source 46 may be any of a variety of known light emitting means, such as at least one light emitting diode 48 configured to project or emit visible light in a general direction along an illumination axis. Illustratively, the light source 46 may be configured to provide at least 25 lumens of light output. In other illustrative embodiments, the light source 46 may be configured to project or emit non-visible light (such as infrared (IR) light), for example in situations where visible light could be detrimental to the safety of operators. In such an embodiment, the operators may use night vision goggles (NVGs) to view the emitted light.

The light source 46 may be angled to project or emit light around the lower region and the path of travel of the stretcher 10. In certain illustrative embodiments, the light source 46 may be fixed in position, wherein the direction of the emitted light relative to the frame 14 (e.g. the illumination axis) is also fixed. In other illustrative embodiments, the light source 46 may be moveable. For example, the light source 46 may be coupled to a mount 50 via a pivot coupler 52 such that the direction of the emitted light relative to the frame 14 (e.g. the illumination axis) may be varied. The coupler 52 is configured to permit pivoting of the light source 46 about at least two orthogonal axes 54 and 56. In another illustrative embodiment, the light source 46 may pivot about a third axis 58 extending perpendicular to the first and second axes 54 and 56. At least one actuator 60, illustratively an electric motor, may be operably coupled to the light source 46 for pivoting the light source 46 about the coupler 52.

In yet other illustrative embodiments, the light source 46 may be fixed in position, wherein a plurality of different light emitting diodes 48 project light in different directions. Selection (e.g., via solid state control) of different fixed light emitting diodes 48 is configured to adjust the direction of the emitted light (e.g. the illumination axis). The light emitting diodes 48 may be of different colors and/or intensities to provide an indication of different conditions to an operator.

The light source 46 may include a base or receptacle 62 configured to releasably couple with the LEDs 48. As such, the LEDs 48 may be used as a handheld unit (including individual controls for light activation and/or intensity) separate from the frame 14. A lens 64 may be supported by the light source 46 for directing or focusing light 66 from the LEDs 48 in a desired direction toward a target location 68. Illustratively, the lens 64 may be moved (e.g., rotated) to vary to focal length and/or diameter of the emitted light.

Figure 2:
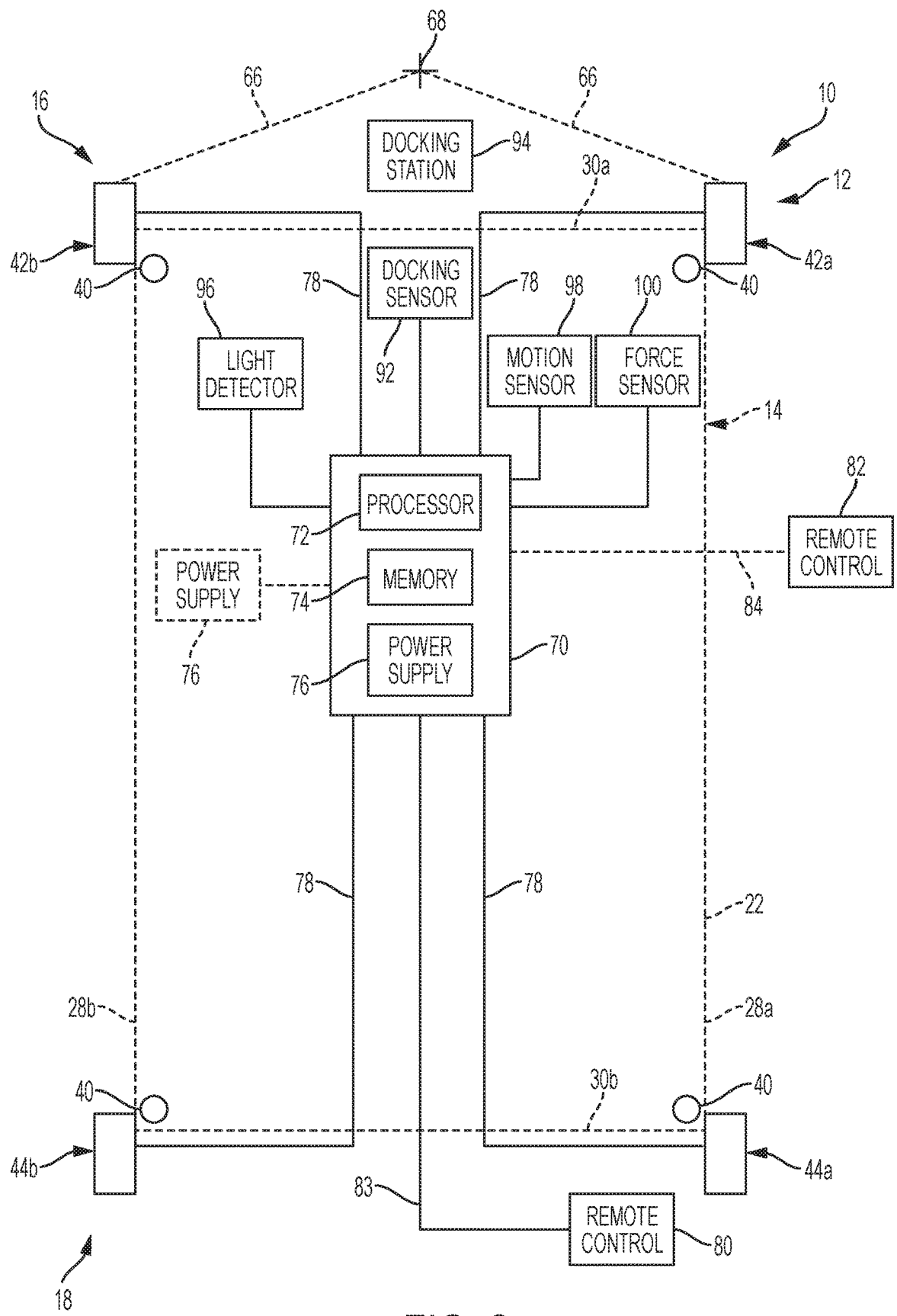
FIG. 2 is a diagrammatic view of the illustrative illumination system of FIG. 1.

With reference to FIG. 2, a controller 70 may be operably coupled to the light emitting modules 42, 44. The controller 70 illustratively includes a processor 72 in communication with a non-volatile memory 74. A power supply 76 is configured to provide power to the light emitting modules 42, 44. As further detailed herein, the controller 70 may operate the light emitting modules 42, 44 via wired, wireless and/or kinetic means (e.g., touch or motion). The controller 70 may be programmed to automatically activate the light emitting modules 42, 44 if surrounding environmental light levels fall below a preselected user setting. The controller 70 may also control and monitor illumination intensity, duration of illumination, power levels, environmental light levels, illumination flash patterns, and/or system errors or malfunctions.

In one illustrative embodiment, the power supply 76 may be integrated within the controller 70. In an alternate illustrative embodiment, the power supply 76 is external to the controller 70. In yet another illustrative embodiment, the power supply 76 may be integrated within the light emitting modules 42, 44. The power supply 76 may utilize rechargeable or non-rechargable power means, such as batteries. Illustratively, the power supply 76 may include wired, wireless, solar, or kinetic means to recharge the rechargeable batteries. In one illustrative embodiment, the power supply 76 may be defined by conventional rechargeable batteries that may be charged when coupled to an external power supply, such as a conventional 110 volt outlet (not shown). Alternatively, the batteries may be charged by removing the batteries from the unit and sliding them into a separate designated charger or an automatic wired or wireless charging system within the emergency vehicle (not shown). Conventional wires or cables 78 may electrically couple the light emitting modules 42, 44 to the controller 70 and/or the power supply 76.

Figure 4:
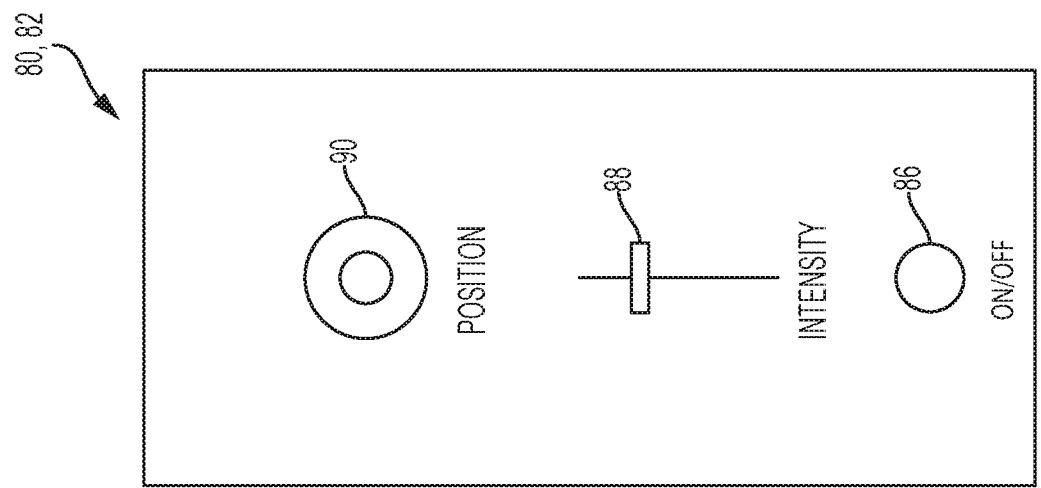
FIG. 4 is a top plan view of an illustrative user interface of the illumination system of FIG. 2.

With reference to FIGS. 2 and 4, a user interface or remote control 80, 82 is illustratively coupled to the controller 70. In one illustrative embodiment, the remote control 80 is electrically coupled to the controller 70 via a wire or cable 83. In another illustrative embodiment, the remote control 82 is coupled to the controller 70 via a wireless transmission 84. The remote control 80, 82 illustratively includes an activation input 86, a light intensity input 88 and an actuator positioning input 90. In other illustrative embodiments, the user interface (including activation input 86, light intensity input 88 and/or actuator positioning input 90) may be integrated into the individual light emitting modules 42, 44.

The power supply 76 may or may not be combined into one unit as the central controller 70 and/or the remote control 80, 82. The power supply 76 may provide power to the numerous light emitting modules 42, 44, the remote control 80, 82, and the central controller 70.

With further reference to FIG. 4, the activation input 86 may comprise a push button for turning on and off the light emitting diodes 48. The light intensity input 88 may comprise a slide switch configured to control the intensity of light emitted by light emitting diodes 48. The actuator positioning input 90 may comprise a joy stick for controlling the actuator 60 and resulting pivoting movement of the light source 46. In certain illustrative embodiments, the remote control 82 may be defined by a program or application stored on a smart device (e.g., a phone or tablet). In certain illustrative embodiments, the user interface 80, 82 may comprise a touch screen or a finger trackpad.

In a further illustrative embodiment, a docking sensor 92 may be supported by the frame 14 and is configured to cooperate with a patient transport apparatus docking station 94. Illustratively, the docking station 94 is supported within an emergency patient transport vehicle, such as an ambulance. The docking sensor 92 is operably coupled to the controller 70. Illustratively, the controller 70 is configured to deactivate the light emitting modules 42, 44 when the docking sensor 92 detects that the frame 14 has been coupled to the docking station 94, and to activate the light emitting modules 42, 44 when the docking sensor 92 detects that the frame 14 has been uncoupled from the docking station 94.

An environmental light sensor or detector 96 is illustratively coupled to the controller 70. The controller 70 activates the light emitting modules 42, 44 when the environmental light detected by the environmental light sensor 96 is below a preselected level, illustratively stored in the memory 74.

In a further illustrative embodiment, a motion sensor 98 is coupled to the controller 70. The controller 70 is configured to cause the actuator 60 to activate one or more of the light sources 46 in response to input from the motion sensor 98. For example, the controller 70 may activate one of the first light emitting modules 42a, 42b or the second light emitting modules 44a, 44b based upon a direction of travel detected by the motion sensor 98. For example, if the motion sensor 98 detects that the patient support stretcher 10 is moving in a forward direction (i.e., from the head end 16 toward the foot end 18) then the second light emitting modules 44a, 44b are activated (but not the first light emitting modules 42a, 42b), and if the motion sensor 98 detects that the patient support stretcher 10 is moving in a rearward direction (i.e., from the foot end 18 toward the head end 16) then the first light emitting modules 42a, 42b are activated (but not the second light emitting modules 44a, 44b).

In a further illustrative embodiment, the controller 70 may cause the actuators 60 of the active light emitting modules 42a, 42b and 44a, 44b to move the light sources 46 to direct light 66 towards a target location 68 defined by the processor 72 based on direction of travel and speed. Alternatively, the controller 70 may activate different light emitting diodes 48 to direct light 66 towards the target location 68.

In yet another illustrative embodiment, the lift mechanism 26 may include a sensor (not shown) to provide a signal to the controller 70 of the relative position of the upper frame 22 relative to the lower frame 24 (i.e., raised or lowered position). In response, the controller 70 is configured to activate one or more of the light emitting modules 42a, 42b, 44a, 44b when the upper frame 22 is in a raised position, and is configured to deactivate the light emitting modules 42a, 42b, 44a, 44b when the upper frame 22 is in a lowered position.

A force or impact sensor 100 is illustratively coupled to the controller 70. The controller 70 may be configured to detect various stretcher accidents such as drops and tips utilizing the motion sensor 98 and/or the force sensor 100. An event recorder and an internal clock may be defined as part of the processor 72. The event recorder cooperates with the internal clock to provide a time and date stamp associated with a detected impact event, which is then stored to the non-volatile memory 74. The clock may also define a timer wherein the illumination system 12 will deactivate after a predetermined time of non-use.

The central controller 70 may include the non-volatile memory 74 of user settings, means to change system settings via wired or wireless means, means to conduct maintenance and system self-checks by wired and wireless means, means to receive commands from wired and/or wireless remote controls 80, 82 and relaying commands to light emitting modules 42, 44, means to control and change illumination module light intensity and activation, and means to activate certain light emitting modules 42, 44 depending on direction of travel and movement.

All equipment housings, connectors, batteries, power supply cables, and control cables may be constructed of material highly resistant to weather, water, shock, impact, vibrations, bodily fluids, submersion, cleaning solvents, debris, and neglect.

Once properly installed, the adaptable rugged stretcher illumination system 12 can be activated per user's preferences. Upon arrival on an emergency medical scene, the stretcher 10 may be removed from an ambulance, and the ambulance crew may activate the illumination system 12 with provided controls prior to navigating the stretcher 10 to the patient. Once at the patient side, the illumination system 12 will allow better visibility of the patient and safer loading of the patient onto the stretcher 10. With the patient secured onto stretcher 10, the stretcher 10 may be wheeled back to the ambulance utilizing the illumination system 12 for ease of navigation. Inside of the ambulance, the illumination system 12 will shut off via manually pressing on/off switch or with an automatic shut off switch (e.g. docking sensor 92 or timer) to preserve battery life.

The present disclosure provides an adaptable rugged stretcher illumination system 12 wherein the illumination system 12 illuminates the surrounding area around and under the stretcher 10, and is easily modified to pre-existing stretchers (e.g., retrofitable). The present invention also permits emergency medical professionals to utilize the illumination system 12 with little or no change to their patient care routines.

According to the present disclosure, an adaptable rugged stretcher illumination system is provided. Illustratively, the rugged stretcher illumination system may include module housings, connectors, power supply wires, remote controls, and control wires constructed of materials highly resistant to weather, extreme hot temperatures, extreme cold temperatures, water, shock, impact, vibrations, bodily fluids, submersion, cleaning solvents, chemicals, debris, and neglect. Illustratively, the stretcher illumination system may be provided with non-permanent and permanent mounting means. The stretcher illumination means may include means to mount components to the stretcher underside.

According to the present disclosure, an adaptable rugged stretcher illumination system may include power and control wires protected with flexible and/or non-flexible barrier as to prevent wire failure. Illustratively, the stretcher illumination system may be positioned to emit light around all sides of the stretcher. The stretcher illumination system is illustratively positioned to emit light to a lower portion of stretcher. Illustratively, the stretcher illumination system may be positioned to emit light diagonally to opposite sides of stretcher. The stretcher illumination system may be positioned to emit light in the path of travel. Illustratively, the stretcher illumination system may be positioned to emit light from behind head portion of stretcher.

According to the present disclosure, an adaptable rugged stretcher illumination system may include wired and/or wireless control means. The illustrative control means may include illumination intensity control means. Illustratively, the stretcher illumination system may include direction of travel sensor means, wherein emitted light may be adjusted per input from the direction of travel sensor means. The illustrative stretcher illumination system may include mounting brackets designed to utilize varying stretcher physical attributes. The illustrative mounting brackets may be adjustable to adjust the angle of emitted light.

According to the present disclosure, an adaptable rugged stretcher illumination system may include a detachable portion for use as a wired or wireless illumination device. Illustratively, the stretcher illumination system may include a detachable portion for use as a wired or wireless illumination device which contains wired or wireless control means. The illustrative stretcher illumination system may include a detachable portion for use as a wired or wireless illumination device which utilizes an attachment system which includes charging means for the rechargeable power supply within the removable portion. Illustratively, the stretcher illumination system may include wireless, solar, and/or kinetic means to charge the rechargeable power supply.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A patient transport apparatus comprising:
a frame;
a plurality of wheels supporting the frame;
a first light emitting module supported by the frame, the first light emitting module including a light source configured to emit light;
a motion sensor supported by the frame; and
a controller operably coupled to the motion sensor, wherein the controller is configured to vary the direction of the emitted light based upon input from the motion sensor.

2. The patient transport apparatus of claim 1, further comprising solid state means, wherein the first light emitting module includes a plurality of fixed light sources emitting light in a plurality of different directions, the solid state means configured to activate different fixed light sources to vary the direction of the emitted light.

3. The patient transport apparatus of claim 1, further comprising an actuator operably coupled to the light source to move the light source about at least two orthogonal axes, wherein the controller causes the actuator to move the light source in response to input from the motion sensor and vary the direction of the emitted light.

4. The patient transport apparatus of claim 1, wherein the light source includes a base and a handheld light emitter removably coupled to the base.

5. The patient transport apparatus of claim 1, wherein the first light emitting module is positioned at a foot end of the frame, and further comprising a second light emitting module positioned at a head end of the frame, wherein the controller activates one of the first light emitting module or the second light emitting module based upon a direction of travel detected by the motion sensor.

6. The patient transport apparatus of claim 1, further comprising an impact sensor configured to detect an impact event on the frame, wherein the light source is configured to be activated in response to a detected impact event.

7. The patient transport apparatus of claim 6, further comprising an event recorder operably coupled to the controller, the event recorder configured to provide a time and date stamp associated with a detected impact event.

8. The patient transport apparatus of claim 1, further comprising an environmental light sensor operably coupled to the controller, wherein the controller activates the light source when the environmental light detected by the environmental light sensor is below a preselected level.

9. The patient transport apparatus of claim 1, further comprising a user interface operably coupled to the controller, the user interface including an activation input, a light intensity input and an actuator positioning input.

10. The patient transport apparatus of claim 1, further comprising an IV pole, and a second light emitting module coupled to the IV pole.

11. The patient transport apparatus of claim 1, further comprising a docking sensor operably coupled to the controller and configured to cooperate with a patient transport apparatus docking station, the controller configured to deactivate the light source when the docking sensor detects that the frame has been coupled to the docking station.

12. A patient transport apparatus comprising:
a frame;
a plurality of wheels supporting the frame;
a first light emitting module supported by the frame, the first light emitting module including a light source;
an impact sensor supported by the frame and configured to detect an impact event on the frame;
an event recorder configured to provide a time and date stamp associated with a detected impact event;
a controller operably coupled to the event recorder, the controller including a memory configured to record the time and date stamp associated with the detected impact event; and
a motion sensor supported by the frame;

wherein the first light emitting module further includes an actuator operably coupled to the light source to move the light source about at least two orthogonal axes, and the controller causes the actuator to move the light source in response to input from the motion sensor.

13. The patient transport apparatus of claim 12, wherein the light source includes a base and a handheld light emitter removably coupled to the base.

14. The patient transport apparatus of claim 12, further comprising an environmental light sensor operably coupled to the controller, wherein the controller activates the light source when the environmental light detected by the environmental light sensor is below a preselected level.

15. A patient transport apparatus comprising:
a frame;
a plurality of wheels supporting the frame;
a first light emitting module supported by the frame, the first light emitting module including a light source;
an impact sensor supported by the frame and configured to detect an impact event on the frame;
an event recorder configured to provide a time and date stamp associated with a detected impact event;
a controller operably coupled to the event recorder, the controller including a memory configured to record the time and date stamp associated with the detected impact event;
wherein the first light emitting module is positioned at a foot end of the frame; and
a second light emitting module positioned at a head end of the frame;
wherein the controller activates one of the first light emitting module or the second light emitting module based upon a direction of travel detected by the motion sensor.

16. A patient transport apparatus comprising:
a frame;
a plurality of wheels supporting the frame;
a first light emitting module supported by the frame, the first light emitting module including a light source;
an impact sensor supported by the frame and configured to detect an impact event on the frame;
an event recorder configured to provide a time and date stamp associated with a detected impact event;
a controller operably coupled to the event recorder, the controller including a memory configured to record the time and date stamp associated with the detected impact event; and
a user interface operably coupled to the controller, the user interface including an activation input, a light intensity input and an actuator positioning input.

17. A patient transport apparatus comprising:
a frame;
a plurality of wheels supporting the frame;
a first light emitting module supported by the frame, the first light emitting module including a light source, and an actuator operably coupled to the light source to move the light source about at least two orthogonal axes;
a controller operably coupled to the actuator; and
a user interface operably coupled to the controller, the user interface including an activation input, a light intensity input and an actuator positioning input.

18. The patient transport apparatus of claim 17, further comprising a motion sensor supported by the frame, wherein the controller causes the actuator to move the light source in response to input from the motion sensor.

19. The patient transport apparatus of claim 17, wherein the light source includes a base and a handheld light emitter removably coupled to the base.

20. The patient transport apparatus of claim 17, wherein the first light emitting module is positioned at a foot end of the frame, and further comprising a second light emitting module positioned at a head end of the frame, wherein the controller activates one of the first light emitting module or the second light emitting module based upon a direction of travel detected by the motion sensor.

21. The patient transport apparatus of claim 17, further comprising an impact sensor configured to detect an impact event on the frame.

22. The patient transport apparatus of claim 17, further comprising an environmental light sensor operably coupled to the controller, wherein the controller activates the light source when the environmental light detected by the environmental light sensor is below a preselected level.

\* \* \* \* \*